(12) United States Patent
Clift

(10) Patent No.: US 11,553,230 B2
(45) Date of Patent: Jan. 10, 2023

(54) PLATFORM-INDEPENDENT USB DRIVER COMMUNICATING I²C COMMANDS TO USB DONGLE THROUGH JAVA APPLICATION

(71) Applicant: Sony Corporation, Tokyo (JP)

(72) Inventor: Graham Clift, Poway, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/855,515

(22) Filed: Apr. 22, 2020

(65) Prior Publication Data

US 2021/0337257 A1  Oct. 28, 2021

(51) Int. Cl.
*H04N 21/41* (2011.01)

(52) U.S. Cl.
CPC ............................ *H04N 21/4104* (2013.01)

(58) Field of Classification Search
CPC ............. H04N 21/4104; H04N 21/443; H01Q 1/2275; G06F 13/38; G06F 13/42; G06F 13/4282
See application file for complete search history.

(56) References Cited

U.S. PATENT DOCUMENTS

| | | | | |
|---|---|---|---|---|
| 8,671,429 B1 * | 3/2014 | Lee | ................. | H04N 21/44231 725/49 |
| 9,710,055 B1 * | 7/2017 | Lee | ......................... | G06F 8/654 |
| 2003/0014766 A1 * | 1/2003 | Dinwiddie | ....... | H04N 21/43615 725/126 |
| 2004/0254014 A1 * | 12/2004 | Quraishi | ................. | G07F 17/32 463/29 |
| 2010/0077443 A1 * | 3/2010 | Wang | ................. | H04N 21/4113 725/153 |
| 2011/0016494 A1 * | 1/2011 | Linhardt | ............ | H04N 21/4184 725/62 |
| 2013/0072260 A1 * | 3/2013 | Nair | ...................... | G06F 13/102 455/566 |
| 2016/0381179 A1 * | 12/2016 | Heagdorens | ............ | H04L 67/34 370/252 |
| 2017/0280093 A1 * | 9/2017 | Xue | ....................... | H04N 21/43 |
| 2018/0032350 A1 * | 2/2018 | Lee | .......................... | G06F 1/266 |
| 2019/0121682 A1 * | 4/2019 | Adiletta | ................ | G06F 13/362 |

OTHER PUBLICATIONS

Maximilien, Java™ API for USB (javax.usb), Apr. 4, 2001 <https://edelivery.oracle.com/otn-pub/jcp/7837-usb-0.9.0-prd-spec-oth-JSpec/javax_usb-0_9_0-pr-spec.pdf> Accessed Jun. 2, 2021 (Year: 2001).*

(Continued)

*Primary Examiner* — An Son P Huynh
*Assistant Examiner* — Patrick A Ryan
(74) *Attorney, Agent, or Firm* — John L. Rogitz

(57) ABSTRACT

Techniques are described for expanding and/or improving the Advanced Television Systems Committee (ATSC) 3.0 television protocol in robustly delivering the next generation broadcast television services. A USB driver communicates I²C through a JAVA® application with a USB dongle implementing for example an ATSC 3.0 tuner, with the JAVA application simply passing I²C communication between the dongle and driver such that the driver is platform independent.

20 Claims, 4 Drawing Sheets

(56) References Cited

OTHER PUBLICATIONS

"RFC 4033, DNS Security Introduction and Requirements," Arends, R., Austein, R., Larson, M., Massey, D., and S. Rose, Internet Engineering Task Force, Fremont, CA, Mar. 2005.
"RFC 4055, Additional Algorithms and Identifiers for RSA Cryptography for use in the Internet X.509 Public Key Infrastructure Certificate and Certificate Revocation List (CRL) Profile," J. Schaad, B. Kaliski, R. Housley, Internet Engineering Task Force, Fremont, CA, Jun. 2005.
"ATSC Standard: ATSC 3.0 Interactive Content (A/344)", May 2, 2019.
"ATSC Standard: ATSC 3.0 Security and Service Protection", Aug. 20, 2019.
"ATSC Standard: ATSC 3.0 System", Sep. 17, 2019.
"ATSC Standard: Signaling, Delivery, Synchronization, and Error Protection (A/331)", Jun. 19, 2019.
"RFC 3279, Algorithms and Identifiers for the Internet X.509 Public Key Infrastructure Certificate and Certificate Revocation List (CRL) Profile," L. Bassham, W. Polk, R. Housley, Internet Engineering Task Force, Fremont, CA, Apr. 2002.
"RFC 5280, Internet X.509 Public Key Infrastructure Certificate and Certificate Revocation List (CRL) Profile," D. Cooper, S. Santesson, S. Farrell, S. Boeyen, R. Housley, W. Polk, Internet Engineering Task Force, Fremont, CA, May 2008.
"RFC 5289, TLS Elliptic Curve Cipher Suites with SHA-256/384 and AES Galois Counter Mode (GCM)," E. Rescorla, Internet Engineering Task Force, Fremont, CA, Aug. 2008.
"RFC 5480, Elliptic Curve Cryptography Subject Public Key Information," S. Turner, D. Brown, K. Yiu, R. Housley, T. Polk, Internet Engineering Task Force, Fremont, CA, Mar. 2009.
"RFC 5652, Cryptographic Message Syntax (CMS)," R. Housley, Internet Engineering Task Force, Fremont, CA, Sep. 2009.
"RFC 5751, Secure/Multipurpose Internet Mail Extensions (S/MIME) Version 3.Message Specification," B. Ramsdell, S. Turner, Internet Engineering Task Force, Fremont, CA, Jan. 2010.
"RFC 5753, Use of Elliptic Curve Cryptography (ECC) Algorithms in Cryptographic Message Syntax (CMS)," S. Turner, D. Brown, Internet Engineering Task Force, Fremont, CA, Jan. 2010.
"RFC 5758, Internet X.509 Public Key Infrastructure: Additional Algorithms and Identifiers for DSA and ECDSA," Q. Dang, S. Santesson, K. Moriarty, D. Brown, T. Polk, Internet Engineering Task Force, Fremont, CA, Jan. 2010.
"RFC 5940, Additional Cryptographic Message Syntax (CMS) Revocation Information Choices," S. Turner, R. Housley, Internet Engineering Task Force, Fremont, CA, Aug. 2010.
"RFC 6960, X.509 Internet Public Key Infrastructure Online Certificate Status Protocol—OCSP," S. Santesson, M. Myers, R. Ankney, A. Malpani, S. Galperin, C. Adams, Internet Engineering Task Force, Fremont, CA, Jun. 2013.
"RFC 5019, The Lightweight Online Certificate Status Protocol (OCSP) Profile for High-Volume Environments," A. Deacon, R. Hurst, Internet Engineering Task Force, Fremont, CA, Sep. 2007.

\* cited by examiner

PLATFORM-INDEPENDENT USB DRIVER COMMUNICATING I²C COMMANDS TO USB DONGLE THROUGH JAVA APPLICATION

FIELD

This application relates to technical advances necessarily rooted in computer technology and directed to digital television, and more particularly to Advanced Television Systems Committee (ATSC) 3.0.

BACKGROUND

The Advanced Television Systems Committee (ATSC) 3.0 suite of standards is a set of over a dozen industry technical standards as indicated in A/300 for delivering the next generation of broadcast television. ATSC 3.0 supports delivery of a wide range of television services including televised video, interactive services, non-real time delivery of data, and tailored advertising to a large number of receiving devices, from ultra-high definition televisions to wireless telephones. ATSC 3.0 also orchestrates coordination between broadcast content (referred to as "over the air") and related broadband delivered content and services (referred to as "over the top"). ATSC 3.0 is designed to be flexible so that as technology evolves, advances can be readily incorporated without requiring a complete overhaul of any related technical standard. Present principles are directed to such advances as divulged below.

SUMMARY

As understood herein, digital TV tuners are controlled using basic inter-integrated circuit (I²C) commands, but this offers only rudimentary functionality that might otherwise be available from the use of higher-level code such as JAVA®. As also understood herein, Android® operating systems that support JAVA applications in universal serial bus (USB) environments require a USB driver for a USB device to be rendered as a hardware abstraction layer (HAL) that is written in C (or a version thereof), and when the C code of the driver is changed, the JAVA application must also be changed. With this recognition in mind, it is desirable to provide an architecture in which a change to the USB driver code does not entail a change to a related JAVA application and that is not platform dependent.

Accordingly, a digital television system includes at least one universal serial bus (USB) dongle and at least one application configured to issue commands in a first code such as, for example, JAVA. The system also includes at least one USB driver configured to communicate with the USB dongle using inter-integrated circuit (I²C) signals that are not rendered in the first code. The USB driver communicates with the application which in turn communicates with the USB dongle such that I²C signals between the USB dongle and USB driver pass through the application.

In example embodiments, the USB dongle is configured to implement a digital TV tuner. Note that present principles also may be applied to the communication of permissions.

In an example implementation, the system may include at least one USB manager communicatively between the application and the USB dongle, and at least one hardware abstraction layer (HAL) communicatively between the USB manager and the USB dongle. In example embodiments the system can include at least one compiler such as an Android® native development kit (NDK) communicatively between the application and the USB driver and at least one JAVA native interface (JNI) communicatively between the application and the compiler.

In another aspect, a digital television system includes at least one receiver with at least one processor programmed with instructions to configure the processor to execute at least one JAVA® application (JA) configured to provide digital television functionality. The processor is configured to execute the JA to pass inter-integrated circuit (I²C) signals between a universal serial bus (USB) dongle and a USB driver configured to control the USB dongle.

In another aspect, in a digital television system, a method includes generating at least one digital television tuner command using at least one JAVA® application (JA), and passing inter-integrated circuit (I²C) signals between a universal serial bus (USB) dongle and a USB driver configured to control the USB dongle through the JA to satisfy the digital television tuner command.

In another aspect, a dongle includes at least one inter-integrated circuit (I²C) interface to communicate with at least one universal serial bus (USB) driver and at least one tuner. The dongle is configured to execute at least one digital television tuner command originated by least one JAVA® application (JA) by exchanging I²C signals with at least one universal serial bus (USB) driver configured to control the dongle through the JA to satisfy the digital television tuner command.

The details of the present application, both as to its structure and operation, can best be understood in reference to the accompanying drawings, in which like reference numerals refer to like parts, and in which:

DETAILED DESCRIPTION

Figure 1:
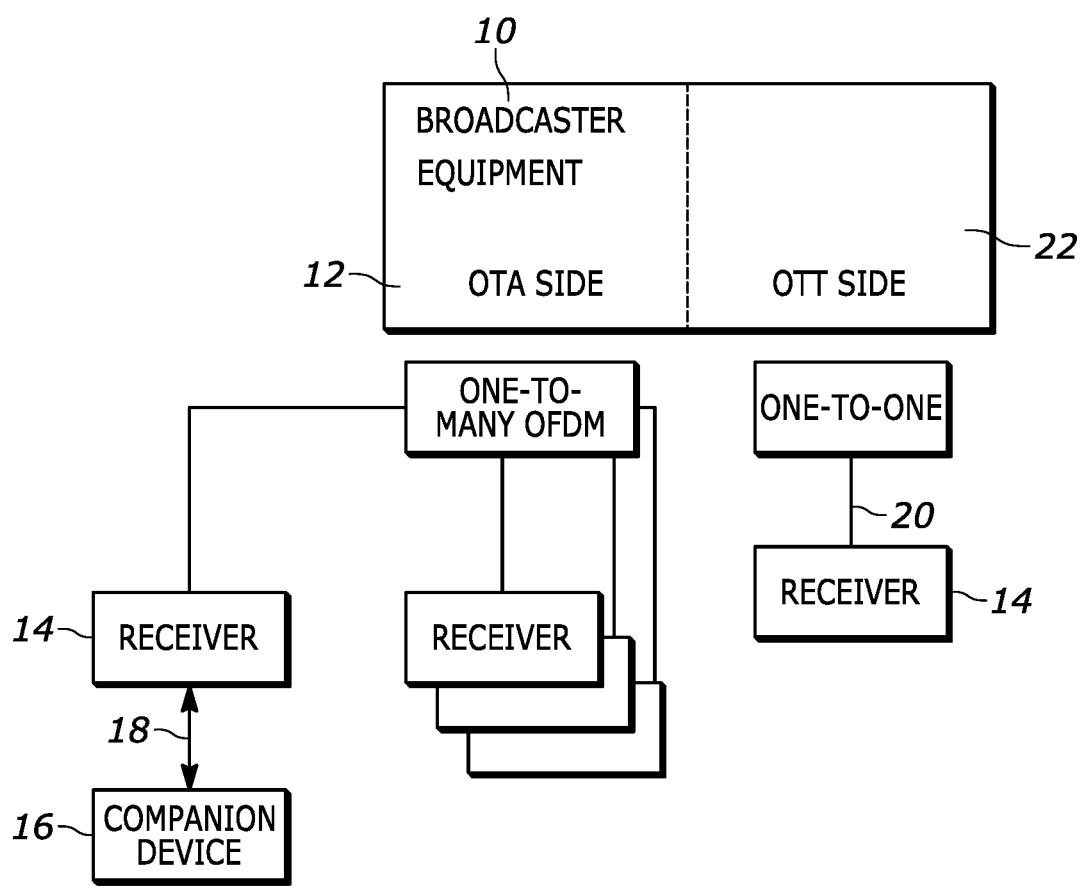
FIG. 1 is a block diagram of an Advanced Television Systems Committee (ATSC) 3.0 system.

This disclosure relates to technical advances in digital television such as in Advanced Television Systems Committee (ATSC) 3.0 television. An example system herein may include ATSC 3.0 source components and client components, connected via broadcast and/or over a network such that data may be exchanged between the client and ATSC 3.0 source components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google, such as Android®. These operating environments may be used to execute one or more browsing programs, such as a browser made by Microsoft or Google or Mozilla or other browser program that can access websites hosted by the Internet servers discussed below.

ATSC 3.0 source components may include broadcast transmission components and servers and/or gateways that may include one or more processors executing instructions that configure the source components to broadcast data and/or to transmit data over a network such as the Internet. A client component and/or a local ATSC 3.0 source component may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library. While flow chart format may be used, it is to be understood that software may be implemented as a state machine or other logical method.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to hypertext markup language (HTML)-5, Java®/Javascript, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Turning to FIG. 1, an example of an ATSC 3.0 source component is labeled "broadcaster equipment" 10 and may include over-the-air (OTA) equipment 12 for wirelessly broadcasting, typically via orthogonal frequency division multiplexing (OFDM) in a one-to-many relationship, television data to plural receivers 14 such as ATSC 3.0 televisions. One or more receivers 14 may communicate with one or more companion devices 16 such as remote controls, tablet computers, mobile telephones, and the like over a short range, typically wireless link 18 that may be implemented by Bluetooth®, low energy Bluetooth, other near field communication (NFC) protocol, infrared (IR), etc.

Also, one or more of the receivers 14 may communicate, via a wired and/or wireless network link 20 such as the Internet, with over-the-top (OTT) equipment 22 of the broadcaster equipment 10 typically in a one-to-one relationship. The OTA equipment 12 may be co-located with the OTT equipment 22 or the two sides 12, 22 of the broadcaster equipment 10 may be remote from each other and may communicate with each other through appropriate means. In any case, a receiver 14 may receive ATSC 3.0 television signals OTA over a tuned-to ATSC 3.0 television channel and may also receive related content, including television, OTT (broadband). Note that computerized devices described in all of the figures herein may include some or all of the components set forth for various devices in FIGS. 1 and 2.

Figure 2:
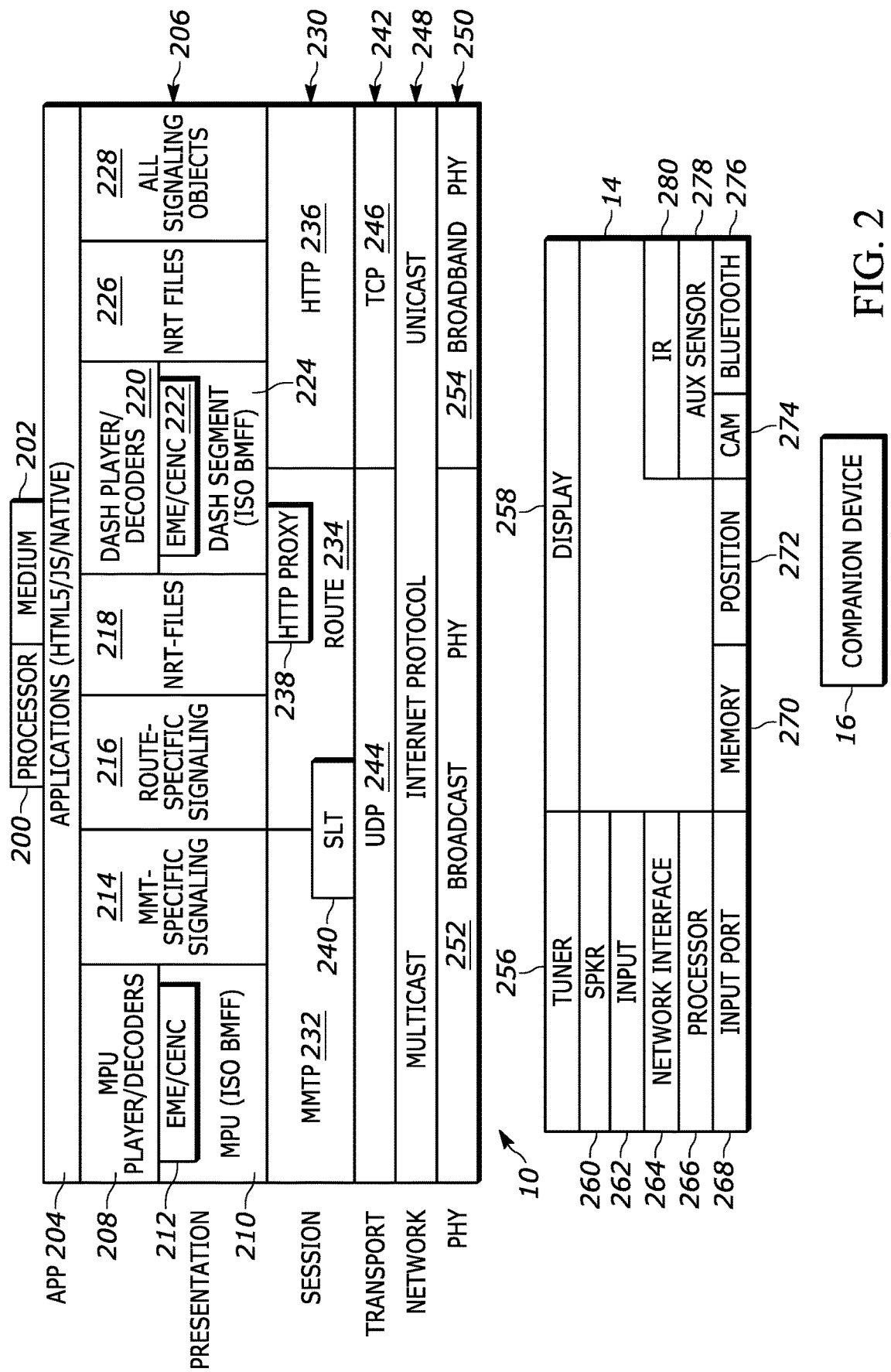
FIG. 2 is a block diagram showing components of the devices shown in FIG. 1.

Referring now to FIG. 2, details of examples of components shown in FIG. 1 may be seen. FIG. 2 illustrates an example protocol stack that may be implemented by a combination of hardware and software. Using the ATSC 3.0 protocol stack shown in FIG. 2 and modified as appropriate for the broadcaster side, broadcasters can send hybrid service delivery in which one or more program elements are delivered via a computer network (referred to herein as "broadband" and "over-the-top" (OTT)) as well as via a wireless broadcast (referred to herein as "broadcast" and "over-the-air" (OTA)). FIG. 2 also illustrates an example stack with hardware that may be embodied by a receiver.

Disclosing FIG. 2 in terms of broadcaster equipment 10, one or more processors 200 accessing one or more computer storage media 202 such as any memories or storages described herein may be implemented to provide one or more software applications in a top-level application layer 204. The application layer 204 can include one or more software applications written in, e.g., HTML5/Javascript running in a runtime environment. Without limitation, the applications in the application stack 204 may include linear TV applications, interactive service applications, companion screen applications, personalization applications, emergency alert applications, and usage reporting applications. The applications typically are embodied in software that represents the elements that the viewer experiences, including video coding, audio coding and the run-time environment. As an example, an application may be provided that enables a user to control dialog, use alternate audio tracks, control audio parameters such as normalization and dynamic range, and so on.

Below the application layer 204 is a presentation layer 206. The presentation layer 206 includes, on the broadcast (OTA) side, broadcast audio-video playback devices referred to as Media Processing Units (MPU) 208 that, when implemented in a receiver, decode and playback, on one or more displays and speakers, wirelessly broadcast audio video content. The MPU 208 is configured to present International Organization for Standardization (ISO) base media file format (BMFF) data representations 210 and video in high efficiency video coding (HEVC) with audio in, e.g., Dolby audio compression (AC)-4 format. ISO BMFF is a general file structure for time-based media files broken into "segments" and presentation metadata. Each of the files is essentially a collection of nested objects each with a type and a length. To facilitate decryption, the MPU 208 may access a broadcast side encrypted media extension (EME)/ common encryption (CENC) module 212.

FIG. 2 further illustrates that on the broadcast side the presentation layer 206 may include signaling modules, including either motion pictures expert group (MPEG) media transport protocol (MMTP) signaling module 214 or real-time object delivery over unidirectional transport (ROUTE) signaling module 216 for delivering non-real time (NRT) content 218 that is accessible to the application layer 204. NRT content may include but is not limited to stored replacement advertisements.

On the broadband (OTT or computer network) side, when implemented by a receiver the presentation layer 206 can include one or more dynamic adaptive streaming over hypertext transfer protocol (HTTP) (DASH) player/decoders 220 for decoding and playing audio-video content from the Internet. To this end the DASH player 220 may access a broadband side EME/CENC module 222. The DASH content may be provided as DASH segments 224 in ISO/BMFF format.

As was the case for the broadcast side, the broadband side of the presentation layer 206 may include NRT content in files 226 and may also include signaling objects 228 for providing play back signaling.

Below the presentation layer 206 in the protocol stack is a session layer 230. The session layer 230 includes, on the broadcast side, either MMTP protocol 232 or ROUTE protocol 234. Note that the ATSC standard provides an option to use MPEG MMT for transport, though it is not shown here.

On the broadband side the session layer 230 includes HTTP protocol 236 which may be implemented as HTTP-secure (HTTP(S)). The broadcast side of the session layer 230 also may employ a HTTP proxy module 238 and a service list table (SLT) 240. The SLT 240 includes a table of signaling information which is used to build a basic service listing and provide bootstrap discovery of the broadcast content. Media presentation descriptions (MPD) are included in the "ROUTE Signaling" tables delivered over user datagram protocol (UDP) by the ROUTE transport protocol.

A transport layer 242 is below the session layer 230 in the protocol stack for establishing low-latency and loss-tolerating connections. On the broadcast side the transport layer 242 uses (UDP 244 and on the broadband side transmission control protocol (TCP) 246.

The example non-limiting protocol stack shown in FIG. 2 also includes a network layer 248 below the transport layer 242. The network layer 248 uses Internet protocol (IP) on both sides for IP packet communication, with multicast delivery being typical on the broadcast side and unicast being typical on the broadband side.

Below the network layer 248 is the physical layer 250 which includes broadcast transmission/receive equipment 252 and computer network interface(s) 254 for communicating on the respective physical media associated with the two sides. The physical layer 250 converts Internet Protocol (IP) packets to be suitable to be transported over the relevant medium and may add forward error correction functionality to enable error correction at the receiver as well as contain modulation and demodulation modules to incorporate modulation and demodulation functionalities. This converts bits into symbols for long distance transmission as well as to increase bandwidth efficiency. On the OTA side the physical layer 250 typically includes a wireless broadcast transmitter to broadcast data wirelessly using orthogonal frequency division multiplexing (OFDM) while on the OTT side the physical layer 250 includes computer transmission components to send data over the Internet.

A DASH Industry Forum (DASH-IF) profile sent through the various protocols (HTTP/TCP/IP) in the protocol stack may be used on the broadband side. Media files in the DASH-IF profile based on the ISO BMFF may be used as the delivery, media encapsulation and synchronization format for both broadcast and broadband delivery.

Each receiver 14 typically includes a protocol stack that is complementary to that of the broadcaster equipment.

A receiver 14 in FIG. 1 may include, as shown in FIG. 2, an Internet-enabled TV with an ATSC 3.0 TV tuner (equivalently, set top box controlling a TV) 256. The receiver 14 may be an Android®-based system. The receiver 14 alternatively may be implemented by a computerized Internet enabled ("smart") telephone, a tablet computer, a notebook computer, a wearable computerized device, and so on. Regardless, it is to be understood that the receiver 14 and/or other computers described herein is configured to undertake present principles (e.g. communicate with other devices to undertake present principles, execute the logic described herein, and perform any other functions and/or operations described herein).

Accordingly, to undertake such principles the receiver 14 can be established by some or all of the components shown in FIG. 1. For example, the receiver 14 can include one or more displays 258 that may be implemented by a high definition or ultra-high definition "4K" or higher flat screen and that may or may not be touch-enabled for receiving user input signals via touches on the display. The receiver 14 may also include one or more speakers 260 for outputting audio in accordance with present principles, and at least one additional input device 262 such as, e.g., an audio receiver/microphone for, e.g., entering audible commands to the receiver 14 to control the receiver 14. The example receiver 14 may further include one or more network interfaces 264 for communication over at least one network such as the Internet, a WAN, a LAN, a PAN etc. under control of one or more processors 266. Thus, the interface 264 may be, without limitation, a Wi-Fi transceiver, which is an example of a wireless computer network interface, such as but not limited to a mesh network transceiver. The interface 264 may be, without limitation, a Bluetooth® transceiver, Zigbee® transceiver, Infrared Data Association (IrDA) transceiver, Wireless USB transceiver, wired USB, wired LAN, Powerline or Multimedia over Coax Alliance (MoCA). It is to be understood that the processor 266 controls the receiver 14 to undertake present principles, including the other elements of the receiver 14 described herein such as, for instance, controlling the display 258 to present images thereon and receiving input therefrom. Furthermore, note the network interface 264 may be, e.g., a wired or wireless modem or router, or other appropriate interface such as, e.g., a wireless telephony transceiver, or Wi-Fi transceiver as mentioned above, etc.

In addition to the foregoing, the receiver 14 may also include one or more input ports 268 such as a high definition multimedia interface (HDMI) port or a USB port to physically connect (using a wired connection) to another CE device and/or a headphone port to connect headphones to the receiver 14 for presentation of audio from the receiver 14 to a user through the headphones. For example, the input port 268 may be connected via wire or wirelessly to a cable or satellite source of audio video content. Thus, the source may be a separate or integrated set top box, or a satellite receiver. Or, the source may be a game console or disk player.

The receiver 14 may further include one or more computer memories 270 such as disk-based or solid-state storage that are not transitory signals, in some cases embodied in the chassis of the receiver as standalone devices or as a personal video recording device (PVR) or video disk player either internal or external to the chassis of the receiver for playing back audio video (AV) programs or as removable memory media. Also, in some embodiments, the receiver 14 can include a position or location receiver 272 such as but not limited to a cellphone receiver, global positioning satellite (GPS) receiver, and/or altimeter that is configured to e.g. receive geographic position information from at least one satellite or cellphone tower and provide the information to the processor 266 and/or determine an altitude at which the receiver 14 is disposed in conjunction with the processor 266. However, it is to be understood that that another suitable position receiver other than a cellphone receiver, GPS receiver and/or altimeter may be used in accordance with present principles to determine the location of the receiver 14 in e.g. all three dimensions.

Continuing the description of the receiver 14, in some embodiments the receiver 14 may include one or more cameras 274 that may include one or more of a thermal imaging camera, a digital camera such as a webcam, and/or a camera integrated into the receiver 14 and controllable by the processor 266 to gather pictures/images and/or video in accordance with present principles. Also included on the receiver 14 may be a Bluetooth® transceiver 276 or other Near Field Communication (NFC) element for communication with other devices using Bluetooth® and/or NFC technology, respectively. An example NFC element can be a radio frequency identification (RFID) element.

Further still, the receiver 14 may include one or more auxiliary sensors 278 (such as a motion sensor such as an accelerometer, gyroscope, cyclometer, or a magnetic sensor and combinations thereof), an infrared (IR) sensor for receiving IR commands from a remote control, an optical sensor, a speed and/or cadence sensor, a gesture sensor (for sensing gesture commands) and so on providing input to the processor 266. An IR sensor 280 may be provided to receive commands from a wireless remote control. A battery (not shown) may be provided for powering the receiver 14.

The companion device 16 may incorporate some or all of the elements shown in relation to the receiver 14 described above.

The methods described herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the Internet.

Figure 3:
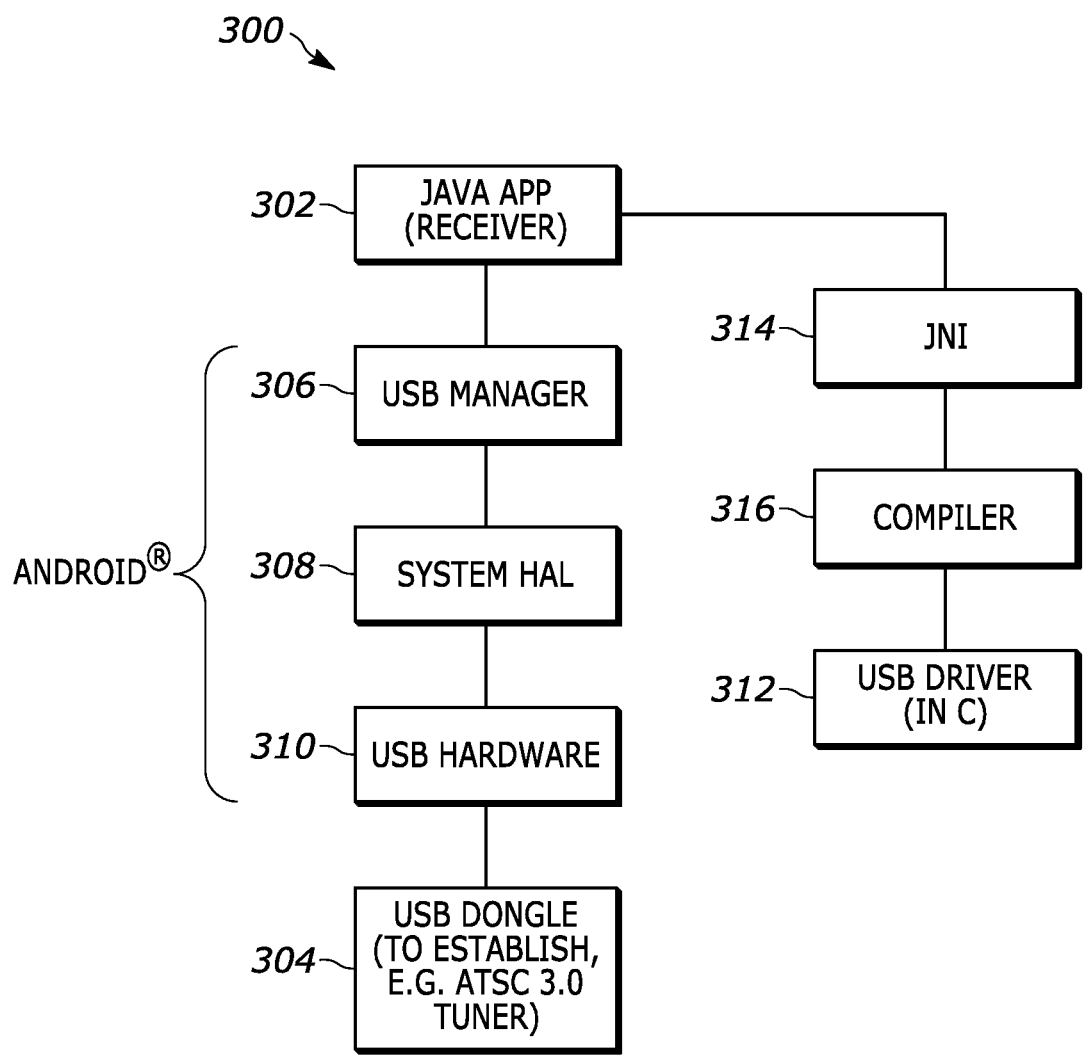
FIG. 3 is a block diagram of a USB dongle and USB driver architecture consistent with present principles.

Now referring to FIG. 3, a receiver 300 is illustrated that may implement some or all of the above features, including one or more processors accessing instructions on one or more computer storages. In the example shown, the instructions may include one or more JAVA applications 302 configured to provide digital television functionality. The JAVA application 302 may require actions by other components in a digital television system such as a digital television tuner and may issue commands in connection therewith. In the example shown, at least one universal serial bus (USB) dongle 304 implements a tuner.

Typically, the operating system of the receiver 300 may be an Android® operating system part of which may include a USB manager 306 communicating directly with the JAVA application 302. In turn, the USB manager 306 may communicate directly with a system hardware abstraction layer (HAL) 308 which in turn may communicate directly with USB hardware 310 into which the USB dongle 304 may be plugged.

At least one USB driver 312 is configured to communicate with the USB dongle 304 using inter-integrated circuit ($I^2C$) signals that are rendered in the first code. The USB driver typically is written in C or variations thereof. The driver 312 as shown communicates with the dongle 304 only through the application 302, which in turn communicates with the USB dongle 304 such that $I^2C$ signals between the USB dongle 304 and USB driver 312 pass through the application 302.

In the example shown, communicatively interposed between USB driver 312 and the application 302 is at least one JAVA native interface (JNI) 314 that enables JAVA code in the JAVA application 302 to call and be called by native applications and libraries of the USB driver 312, which typically are written in C or C++. As shown, the JNI 314 is directly coupled to the JAVA application 302. The JNI 314 is also directly coupled to at least one compiler 316 such as an Android® native development kit (NDK) that is communicatively between the USB driver 312 and the JNI 314.

Figure 4:
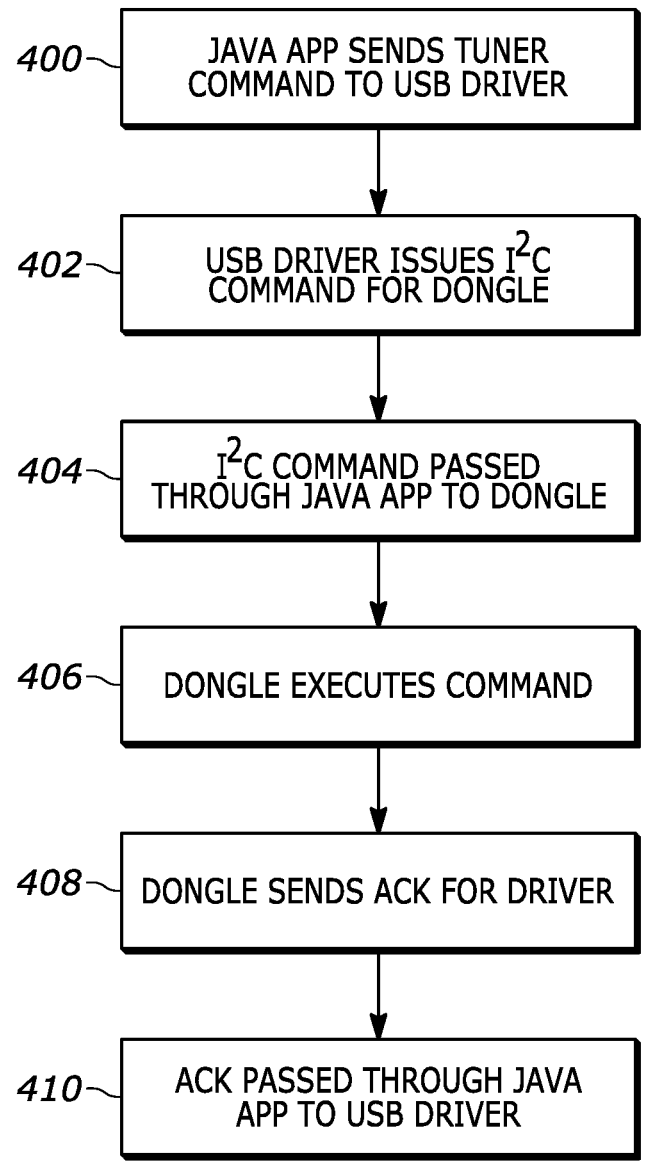
FIG. 4 is a flow chart of example logic consistent with present principles.

FIG. 4 illustrates logic attendant to FIG. 3. Commencing at block 400, the JAVA app 302 sends a tuner command to the USB driver 312 via the JNI 314 and compiler 316. Note that in addition to tuner commands, present principles may be employed for the purpose of establishing permissions.

Moving to block 402, in response to the tuner command the USB driver 312 sends an $I^2C$ signal to the USB dongle 304 through, as indicated at block 404, the JAVA app 302. More specifically, the $I^2C$ signal passes in sequence from the USB driver 312 through the compiler 316, JNI 314, JAVA app 302, USB manager 306, system HAL 308, and USB hardware 310 to the USB dongle 304.

Upon receipt of the $I^2C$ signal the USB dongle 304 executes the command embedded in the $I^2C$ signal at block 406. In some instances, the logic moves to block 408 in which the USB dongle 304 may send an $I^2C$ signal implementing an acknowledgement or other signaling to the JAVA app 302 and/or USB driver 312. In any case, the $I^2C$ signal from the USB dongle 304 passes in sequence from the USB dongle 304 through the USB hardware 310, system HAL 308, and USB manager 306 to the JAVA app 302 at block 410. When the $I^2C$ signal from the USB dongle 304 is also intended for the USB driver 312, the $I^2C$ signal is passed by the JAVA app 302 to, in sequence, the JNI 314 and compiler 316 to the USB driver 312.

It will be appreciated that whilst present principals have been described with reference to some example embodiments, these are not intended to be limiting, and that various alternative arrangements may be used to implement the subject matter claimed herein.

What is claimed is:

1. A digital television system comprising:
   at least one universal serial bus (USB) dongle;
   at least one application configured to issue commands in a first code; and
   at least one USB driver configured to communicate with the USB dongle using inter-integrated circuit (I2C) signals that are not rendered in the first code, the USB driver being communicatively coupled to the application and the application in turn being communicatively coupled to the USB dongle, such that the USB dongle and USB driver must communicate only through the application.

2. The digital television system of claim 1, wherein the digital television system comprises an advanced television systems committee (ATSC) 3.0 system.

3. The digital television system of claim 1, wherein the first code comprises JAVA®.

4. The digital television system of claim 1, wherein the USB dongle is configured to implement a digital TV tuner.

5. The digital television system of claim 1, comprising:
   at least one USB manager communicatively between the application and the USB dongle.

6. The digital television system of claim 5, comprising:
   at least one hardware abstraction layer (HAL) communicatively between the USB manager and the USB dongle.

7. The digital television system of claim 1, comprising:
   at least one compiler communicatively between the application and the USB driver.

8. The digital television system of claim 7, comprising:
   at least one JAVA native interface (JNI) communicatively between the application and the compiler.

9. The digital television system of claim 7, wherein the compiler comprises at least one Android® native development kit (NDK).

10. The digital television system of claim 1, wherein the at least one application is communicatively interposed between the at least one USB driver and the at least one USB dongle.

11. A digital television system comprising:
    at least one receiver comprising at least one processor programmed with instructions to configure the processor to:
    execute at least one JAVA® application (JA) configured to provide digital television functionality; and
    execute the JA to pass inter-integrated circuit (I2C) signals between a universal serial bus (USB) dongle and a USB driver configured to control the USB dongle, the USB driver communicating with the USB dongle only through the JA.

12. The digital television system of claim 11, comprising broadcaster equipment configured to broadcast signals to the USB dongle.

13. The digital television system of claim 11, wherein the digital television system comprises an advanced television systems committee (ATSC) 3.0 system.

14. The digital television system of claim 11, wherein the USB dongle is configured to implement a digital TV tuner and the processor executes the JA to signal the USB channel to change digital channels.

15. The digital television system of claim 11, comprising:
    at least one USB manager communicatively between the JA and the USB dongle.

16. The digital television system of claim 15, comprising:
    at least one hardware abstraction layer (HAL) communicatively between the USB manager and the USB dongle.

17. The digital television system of claim 16, comprising:
    at least one compiler communicatively between the JA and the USB driver.

18. The digital television system of claim 17, comprising:
    at least one JAVA native interface (JNI) communicatively between the JA and the compiler.

19. The digital television system of claim 18, wherein the compiler comprises at least one Android® native development kit (NDK).

20. The digital television system of claim 11, wherein the at least one JA is communicatively interposed between the USB dongle and USB driver.

* * * * *